356-138 SEARCH ROOM

Pritchard 9.

Jan. 8, 1963 S. BRILL 3,072,010

OPTICAL GUIDANCE SYSTEM

T365

Filed Feb. 2, 1959 2 Sheets-Sheet 1

INVENTOR
SAMUEL BRILL

BY Samuel J Stone
ATTORNEY

OPTICAL GUIDANCE SYSTEM

Filed Feb. 2, 1959

INVENTOR
SAMUEL BRILL
BY Samuel J. Stoll
ATTORNEY

United States Patent Office 3,072,010
Patented Jan. 8, 1963

3,072,010
OPTICAL GUIDANCE SYSTEM
Samuel Brill, Union, N.J.,
Filed Feb. 2, 1959, Ser. No. 790,548
3 Claims. (Cl. 88—2.6)

This invention relates to an optical guidance system for guiding a moving vehicle into a confined space.

Illustrative of the many uses to which this invention may be put is the procedure of steering a motor vehicle into a limited parking space within a garage. Specifically, this invention may be used to assist an unskilled driver in guiding an automobile into a predetermined space within a private garage of relatively narrow proportions. Although the invention will herein be described solely in terms of such specific illustrations, this is not to be construed as limiting the scope or application of the invention in any respect whatsoever.

It is the object of this invention to provide an optical guidance system of the character described which possesses the following functional and structural features and advantages:

(1) The guidance system enables the driver to ascertain quickly and easily the exact position of the car relative to the desired or predetermined parking position. This information may be obtained well in advance of entering the garage and with sufficient maneuvering distance remaining to enable the driver to take advantage of such information. Furthermore, the driver may acquire such information through the instrumentality of the present device without leaving his seat in the car or shifting his head from its normal driving position or removing his eyes from the view ahead.

(2) The guidance system affords a high degree of steering guidance, unaffected by the position of the driver inside the car or by such factors as the height of the driver's seat or the level of his eyes. It is known that within a fairly wide range the relative positions of individual drivers vary behind the steering wheel of an automobile. Many drivers sit centrally behind the steering wheel, but there are others who normally sit far to the left or to the right of such central position. It is also known that in the various makes and models of cars in use the drivers' seats are situated at different heights above the ground and that such height differentials are further affected by the conventional practice of raising or lowering the seats in accordance with individual preferences or requirements. Moreover, some drivers are relatively tall and others relatively short, and this factor alone would account for wide variations in the height of their respective lines of vision. The guidance system herein claimed functions properly and accurately regardless of these variations.

(3) The guidance system may be entirely installed in the garage, and there is no need to place any part of it or anything associated with it or controlling it in the car. Once it is properly installed in the garage it may be utilized by any driver in any car for the purpose of gaining entrance into the garage. Furthermore, the height of the garage floor relative to the height of the driveway, and the angle of inclination or declination, if any, of the driveway relative to the garage floor, would have no bearing on the functioning of the guidance system once it is properly installed.

(4) The guidance system is unaffected by such environmental conditions as light, precipitation, temperature or the like. It functions equally as well in daylight and in darkness, in ideal driving weather and in rain or snow, and whether in the hot summer or in the cold winter. There are no moving parts or operating mechanisms in this guidance system which would be adversely affected by such factors.

(5) The guidance system does not require great skill, keen judgment or excessive practice on the part of the user. It is simple to learn and use and does not require any special handling of the automobile.

(6) The guidance system comprises relatively few parts, these parts are all stationary, and they are easily assembled into a unit of relatively small, compact proportions. The result is a relatively inexpensive device which may readily be installed and which occupies a comparatively small space.

The foregoing objects of the invention, with all of their functional and structural features and advantages above described, may be attained by the use of two light reflecting systems which function concurrently to produce two visual images of a single reference point or object. One is a normal image, the other a reversed image. A reversed image is one herein defined as one having its left and right sides interchanged in position, as compared with a normal image. A suitable reference point or object would be one of the headlights of an automobile, preferably the one situated directly in front of the driver. For guidance purposes, the headlights would be turned on, providing a bright image by day or night. As the automobile approaches the garage in which the present device is installed, the left headlight is reflected in the two reflecting systems. Should the automobile happen to be precisely aligned with its predetermined parking space in the garage, the normal and reversed images of its left headlight will be superimposed on each other and the driver will know that he need only maintain his course without deviation in order to properly position the automobile in said parking space. On the other hand, should his course be laterally offset from the prescribed path, either leftwardly or rightwardly thereof, the two images will appear separate and apart from each other in horizontal spaced relationship. One of these images would be distinctive in appearance, as for example by being colored differently from the other image, in order to indicate the nature or direction of the deviation. Should the driver thereby ascertain that he is too far to the left of the predetermined or optimum course, he would steer to the right until the two images merge. Conversely, should he find that he is too far to the right of said course, he would steer to the left.

The invention is based upon the relative behavior of the normal and reverse images with respect to the behavior of the object which produces them, in this case the left headlamp of the automobile. As the object moves across the reflector field, the normal image will move in the same direction as the object; the reverse image will move in the opposite direction. Consequently, should the two images happen to be spaced from each other by reason of the fact that the automobile is off course, steering it further off course would magnify or enlarge the separation between the images, while steering it in the opposite direction to correct the deviation would progressively decrease the distance separating the images until they finally merge.

An important aspect of the guidance system herein described and claimed is that both reflecting systems behave alike with respect to the observer, in this case the driver. Whether the observer moves leftwardly or rightwardly relative to said reflecting systems, the two images of the object (headlight) will both move equally and in precisely the same direction as the observer. This phenomenon should be distinguished from the one last above described. It was above stated that a movement of the object causes its normal image to move in the same direction as the object moves, while at the same time the reverse image moves in the opposite direction. On the other hand, movement of the observer causes both images to move in the same direction as the observer moves.

Therefore a change in the position of the observer does not change the horizontal spacing between the two images and hence does not influence the guidance information provided by the images. In this manner the guidance afforded is independent of the observer's position. Conversely, the position and movement of the object (the headlight) will enable the present invention to function in the manner indicated to orient the driver as to the position of his automobile relative to its projected parking space.

The foregoing procedure is predicated on the use of a plane reflecting surface which produces a normal image, and a corner reflector which consists of a pair of plane reflecting surfaces disposed in perpendicular relation to each other and which produces a reverse image. It will shortly be seen that the plane reflecting surface is also adapted to transmit light, and the two reflectors—plane and corner—are assembled in such manner that both images appear in the plane reflecting surface.

It will be apparent from the detailed description of the invention which is shortly to follow that a curved reflecting surface may in a proper case be substituted for the plane reflecting surface above mentioned. It will also be seen that the corner reflector may take different forms and further, depending upon the relative positions of the plane (or curved) reflector and the corner reflector, it may be found necessary to interpose a third reflector (or other optical device) between said plane and corner reflectors in order to link said latter reflectors optically.

For the purposes of the claims and other portions of the specification, the plane or curved reflecting surface constituting the first component of the present device will be designated a "simple" reflector; the corner reflector, constituting the second component of said device and consisting of more than one reflecting surface, will herein be designated a "compound" reflector.

The invention is illustrated in the accompanying drawing, in which.

Figures 1, 2, 3, 4, 5, 6, 7, 8, 9:
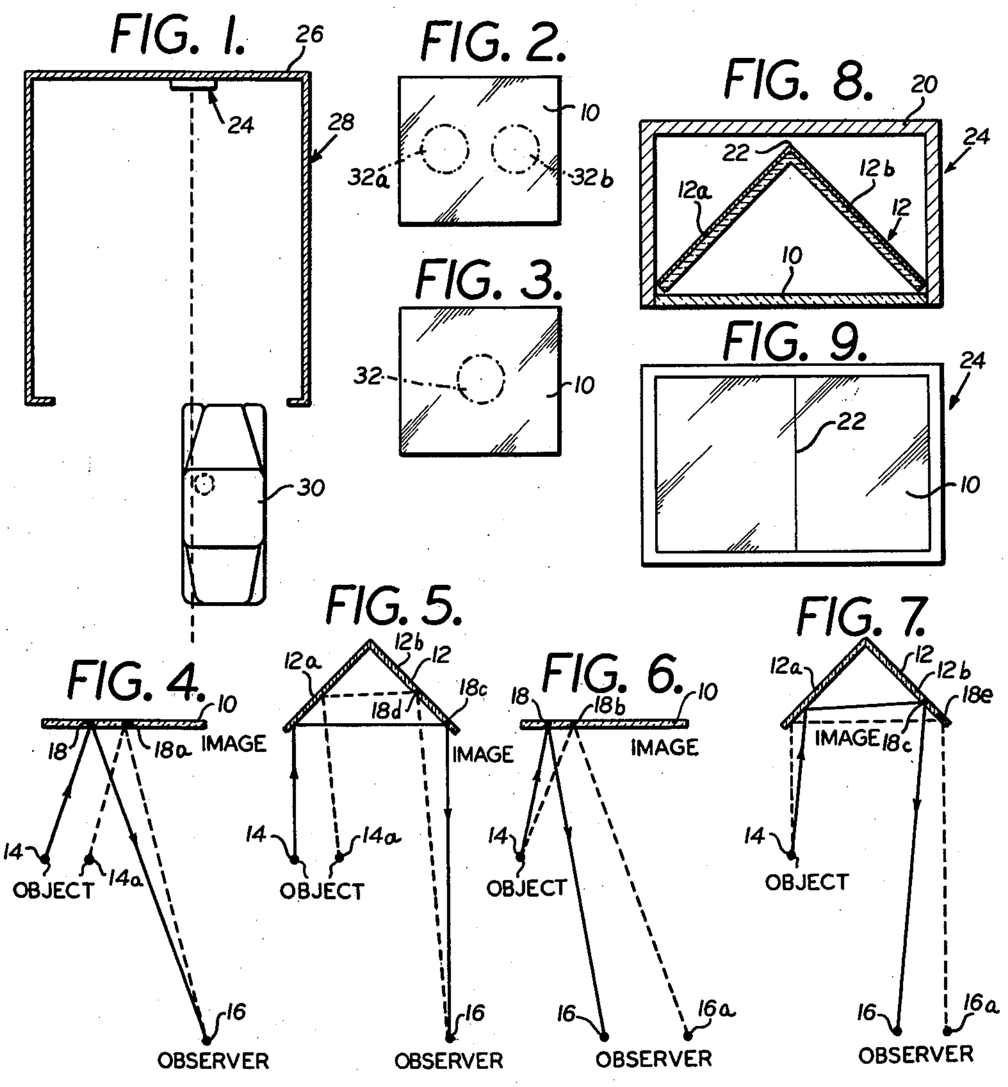
FIG. 1 is a horizontal section through a typical two-car garage, showing an optical guidance system in accordance with the present invention installed therein and showing an automobile approaching said garage under the guidance of said system.
FIG. 2 is a face view of a device embodying said optical guidance system, showing two images of the same object (left headlamp of the automobile shown in FIG. 1) the thereby indicating that the automobile is off course.
FIG. 3 is a similar view but showing the two images merged into a single image, thereby indicating that the automobile is on course.
FIG. 4 is a horizontal section through one of the components of a guidance device made in accordance with this invention, namely, a plane reflector, showing the behavior of a normal image therein of a moving object, the image moving in the same direction as the object.
FIG. 5 is a similar view of a second component of a guidance device made in accordance with this invention, namely, a compound reflector in the form of a corner reflector, also showing the behavior of an image (reverse image) of a moving object, the image moving in the opposite direction from that of the object.
FIG. 6 is a view like that of FIG. 4 but showing the behavior therein of the image of a stationary object as viewed by a moving observer, said image and said observer being shown to move in the same direction.
FIG. 7 is a view similar to that of FIG. 5 but showing the behavior of the image of a stationary object as viewed by a moving observer, said image being shown to move in the same direction as the observer.
FIG. 8 is a horizontal section through an optical guidance device made in accordance with one form of this invention and consisting of the components illustrated in FIGS. 4 to 7 of the drawing.
FIG. 9 is a face view thereof.

The basic principles underlying this invention are illustrated in FIGS. 4 to 7 of the drawing. FIGS. 4 and 6 show one form of the simple reflector component of the present invention, namely, a plane mirror or reflecting surface 10. FIGS. 5 and 7 show the second component which is a compound reflector 12 consisting of a pair of plane reflectors **12*a* and 12*b*** respectively positioned to abut each other at an angle of 90 degrees along one side edge.

Either one of two methods may be used to explain the relative behavior of the plane and corner reflectors shown in FIGS. 4, 5, 6, and 7. One method makes use of the principle of virtual images; the other method makes use of light ray construction diagrams. The two methods are exactly equivalent and produce identical conclusions. In the first method, a virtual image of an object point is a point not actually reached by the rays of light, but from which, after being reflected by a mirror, they appear to come. The virtual image produced by a plane mirror will appear to originate from a point as far behind the mirror as the object is in front. The second method of explanation, by means of light ray construction, shows physically what happens to light rays originating from an object and impinging on a mirror. This method makes use of the principle that a ray of light striking a mirror will be turned back, or reflected, in such a manner that the angle of reflection equals the angle of incidence.

For present purposes the explanation using the light ray construction is preferred, because it provides a correct picture of the physics, and because it employs much simpler and more easily understood diagrams. Reference is made to texts on physics for the validity of this approach; for example, see "A Textbook of Physics" by L. B. Spinney, fourth edition, MacMillan, 1933, pp. 559–562.

In using the light ray construction, it should be recognized that of the light rays which normally emanate from an object, an observer viewing this object will intercept only those rays which travel in his direction. FIGS. 4, 5, 6, and 7 indicate only those rays which actually reach the observer, since the presence of the rays in other directions does not affect the results. Further, in the explanation to follow, an image in a mirror will be considered to originate at a point on the mirror at which the reflection of the light ray actually takes place physically.

In FIG. 4, when an object is located at point 14, an observer positioned at point 16 will see the image of said object at point 18 in reflector 10. The position of point 18 is determined by the law of reflection, which states that the angle of incidence equals the angle of reflection at any reflecting surface. In this case, the angle between line 14—18 and the plane reflector equals the angle between line 18—16 and the reflector. Should the object move to point 14*a*, the image will move to point 18*a*, the observer remaining stationary at point 16. Thus, the image, which in this case is a normal image, will move in the same direction as the object.

Turning now to FIG. 6, it will be assumed that the object will remain stationary at point 14 while the observer will move from point 16 to point 16*a*. In such case, the image will move from point 18 to point 18*b*. It will thus be observed that the image will move in the same direction as the observer, while the object remains stationary. Thus it is clear that in the case of the plane reflector the image will change position in the same direction as either the object or the observer.

Referring to FIG. 5, it will be noted that in the case of the corner reflector an object positioned at point 14 will produce an image at point 18*c* in reflecting surface 12*b* as viewed by an observer positioned at point 16. Point 18*c* results from two reflections, one each at surfaces 12*a* and 12*b*, such that the reflection law is satisfied at each surface. Should the object move from point 14 to point 14*a*, its image as viewed by an observer at point 16 would move to point 18*d*. It will thus be understood that when a corner reflector is used, the image will move in the opposite direction from the direction of movement of the object, the observer remaining at a fixed location.

FIG. 7 shows the behavior of the image in the same corner reflector when the object remains stationary and the position of the observer shifts. The object is shown to be positioned at point 14, and the observer is situated at point 16. In such case the image would be observed at point 18*c*. When the observer moves to point 16*a*, the image will move to point 18*e*. It will thus be observed that, when the object is stationary and the observer moves, the image in corner reflector 12 will move in the same direction as the observer. Thus it is clear that the plane and corner reflectors behave alike with respect to the position of the observer, but oppositely with respect to the position of the object. When these reflectors are assembled together in a manner to produce two images of an object, the physical spacing between the images changes with object position, but not with observer position.

FIGS. 8 and 9 show the two components 10 and 12 in assembled condition within a suitable box or casing 20, the entire assembly being designated by the reference numeral 24. Plane surface 10 occupies a vertical plane forward of the front edges of plane surfaces 12*a* and 12*b* which are also disposed in vertical planes. The line of juncture 22 between said plane surfaces 12*a* and 12*b* extends vertically, and it occupies a central position behind plane reflector 10. It will now be seen that a vertical plane passing through the line of juncture 22 and bisecting the corner reflector would, in effect, constitute the central plane of said corner reflector. Plane reflector 10 consists of clear glass; the front surface acts as a reflector, while sufficient light passes through the glass to the corner reflector behind it. Corner reflectors 12*a* and 12*b* consist of glass mirrors having conventional silver backing.

Device 24 may be mounted on the back wall 26 of a garage 28. Its position on said wall should be such that the vertical plane which bisects the corner reflector would intersect the left head-light of automobile 30 when said automobile is accurately aligned with its predetermined parking space or position in said garage. When the automobile is thus properly on its course in accurate alignment with said parking space, two images will be formed in device 24, both images of the same left headlamp of the automobile, one such image in plane reflector 10 and the other in corner reflector 12. The corner reflector image will be aligned behind the plane reflector image, so that to the observer they will appear to merge to form the single image 32 shown in FIG. 3. Should the automobile, however, be off course, the two images will not merge and they will be observed as images 32*a* and 32*b* situated in horizontally spaced relation as viewed in FIG. 2.

The spaced images 32*a* and 32*b* of the left headlamp of the automobile are an indication to the driver that he is not on the proper course. He must then steer to the side which would bring the two images together, and one way of quickly orienting the driver regarding his true position relative to the axial center of the predetermined parking position would be to render one of the images distinctive, as by coloring it differently from the other image. For example, the corner reflector may be made of colored glass or colored filters may be superimposed upon its two reflecting surfaces. In such case, the image produced in the corner reflector would always be distinguishable from the image produced in the plane reflector. It is assumed, of course, that the plane reflector would be made of clear glass, and the image therefore would in effect be white.

Based upon the principles above described in connection with FIGS. 4 to 7 of the drawing, the following steering procedure would enable the driver to guide his automobile into the garage: Should the white image appear to the left of the colored image, he would steer to the right, thereby causing the white image to move rightwardly with him and the colored image to move in the opposite direction. When they merge, his automobile will be accurately aligned with the parking space. Should the white image be observed to the right of the colored image, he would steer to the left, thereby causing the white image to move leftwardly and the colored image to move rightwardly until they merge.

Figure 10:
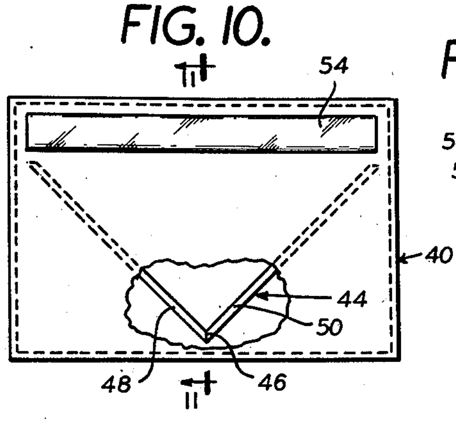
FIG. 10 is a face view, partly broken away, of an optical guidance device made in accordance with a second form of this invention.
Figure 11:
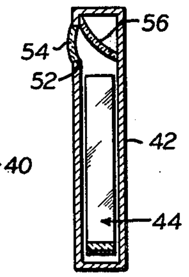
FIG. 11 is a vertical section therethrough on the line 11—11 of FIG. 10.
Figure 12:
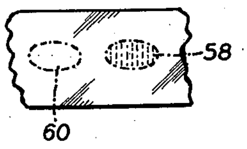
FIG. 12 is a fragmentary and enlarged face view of said optical guidance device and more particularly of its curved reflector component, showing two images of a single object, one of said images being distinctive in color.

Referring now to FIGS. 10, 11 and 12, it will be observed that optical guidance device 40 is made in accordance with a second form of this invention, this form being preferred because it occupies less space than the first form above described. A box or casing 42 is provided, and in it a corner reflector 44. The line of juncture 46 between the two plane reflectors 48 and 50, constituting the corner reflector, extends horizontally, and the bisecting plane between said reflectors 48 and 50 extends vertically. An opening 52 is formed in box 42 in its front wall and along its upper edge. Mounted in said opening 52 is a curved reflector 54 which is made of unsilvered glass plate. Stated differently, this is a light-transmitting as well as a light-reflecting element, and it thereby corresponds to the plane reflector 10 above described. Another curved reflector 56 is positioned within box 42 at an angle between said corner reflector 44 and said curved reflector 54 in order to provide an optical link between said corner reflector and said curved reflector 54. Both reflectors 54 and 56 are curved in the vertical plane, but are straight in the horizontal plane. The central radial plane of curved reflector 54 extends horizontally, and the central radial plane of curved reflector 56 would intersect the first mentioned radial plane at an angle of 45 degrees. Light passing through curved reflector 54 would impinge upon curved reflector 56 and would be reflected downwardly into the corner reflector 44. It should be noted that while reflectors 54 and 56 are shown convex, either or both may be concave, or any combination of convex and concave reflectors may be employed without affecting the results.

Once again the use of color may be embodied in the device to distinguish the two images. Reflectors 48 and 50 may be made of colored glass to produce the colored image 58 shown in FIG. 12. Curved reflector 54 may be made of clear glass to produce the substantially white image 60 also shown in FIG. 12. The device may be used in precisely the same manner as has above been described with respect to the first form of this invention, and such procedure need not here be repeated. It is important to note, however, that the use of curved reflector 54 in the place and stead of plane reflector 10 produces a distinct advantage of a much larger vertical field than possible with a flat reflector of comparable size. Curved reflector 54 adapts the device to the lines of sight of virtually all drivers seated in virtually all automobiles in common use today. Thus, a tall driver seated in a large automobile with his eye level at a relatively great height above the ground, and a relatively short driver seated in a relatively small automobile with his eye level relatively close to the ground, would both be able to use the same optical guidance device without adjusting its vertical or angular position on the wall of the garage.

Figures 13, 14, 15, 16, 17, 18, 19, 20, 21, 22, 23:
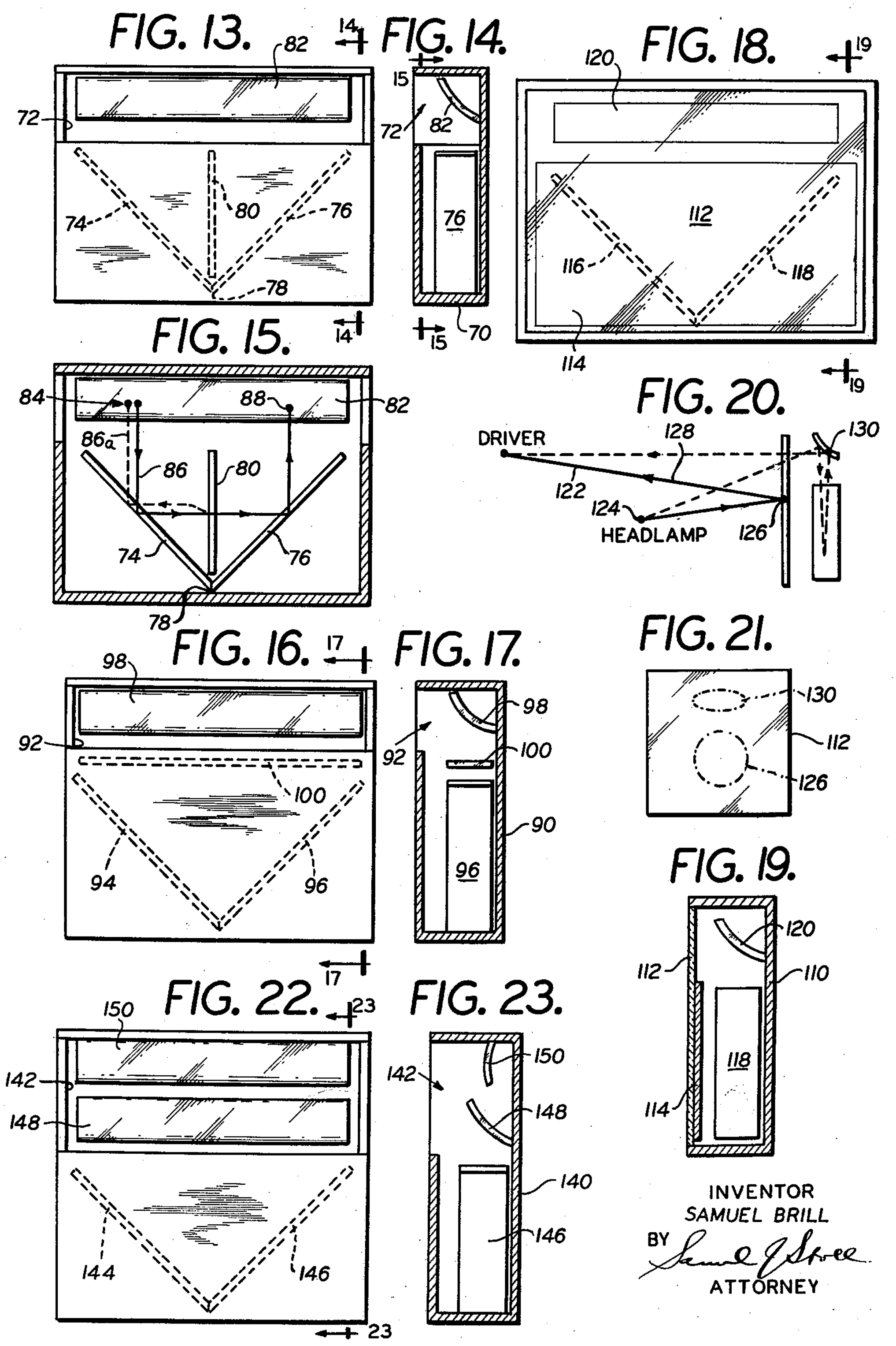
FIG. 13 is a face view of an optical guidance device made in accordance with a third form of this invention.
FIG. 14 is a vertical section therethrough on the line 14—14 of FIG. 13.
FIG. 15 is another vertical section, 90 degrees removed from the section of FIG. 14, taken on the line 15—15 of FIG. 14.
FIG. 16 is a face view of an optical guidance device made in accordance with a fourth form of this invention.
FIG. 17 is a vertical section on the line 17—17 of FIG. 16.
FIG. 18 is a face view of an optical guidance device made in accordance with a fifth form of this invention.
FIG. 19 is a vertical section therethrough on the line 19—19 of FIG. 18.
FIG. 20 is a side view of the optical components of said optical guidance device of FIGS. 18 and 19, showing schematically how two images of a single headlamp are formed therein.
FIG. 21 is a face view of one of said optical components showing the two images.
FIG. 22 is a face view of an optical guidance device made in accordance with a sixth form of this invention.
FIG. 23 is a vertical section therethrough on the line 23—23 of FIG. 22.

A variation of the foregoing optical guidance device may be found in FIGS. 13, 14 and 15 wherein the third form of the invention is illustrated. In this device an enclosure 70 is provided which is open only at the front adjacent its top wall to form a generally rectangular window 72, its larger dimension being horizontal and its smaller dimension being vertical. Disposed within said enclosure below said window, is a corner reflector composed of plane mirrors 74 and 76 respectively which are fixed at right angles to each other, their line of juncture 78 being horizontal and extending from front to rear adjacent the bottom wall of the enclosure and their bisecting plane being vertical and also extending from front to rear. A plane glass reflector 80 occupies said bisecting plane between the two reflectors 74 and 76. In the upper rear corner of the enclosure, behind window 72 and above the corner reflector is a convexly curved mirror 82.

FIG. 15 shows how two images of the same object (a single headlamp) may be formed in curved reflector 82. Said figure also illustrates schematically the reflection paths for said images. Normal image 84 results when incident ray 86 impinges upon plane reflecting surface 74 and is reflected therefrom upon plane reflector 80. The reflected ray back from reflector 80 to reflector 74 and thence to curved reflector 82 is illustrated in the drawing by means of interrupted line 86*a*. Said interrupted line is exaggerated in its spatial relationship to incident ray 86 and is shown in part as a curved line for clarity purposes. Consequently, said normal image 84 is shown as two images in close proximity to each other but what is intended is a showing of a single normal image.

Since plane reflector 80 is also transparent to light, the same incident ray 86 will pass through it and impinge upon reflector 76 which will then reflect it upon curved reflector 82 to form a reversed image 88.

It will now be understood from all the foregoing that the normal image 84 will be provided either by reflectors 74 and 80 or by reflectors 76 and 80, depending on whether the object is positioned to the left or right of said reflector 80. To clarify this point, it will be understood that a normal image is produced by two mirrors held at an angle of 45 degrees with respect to each other. This is the angle between reflector 80 on the one hand and reflectors 74 and 76 on the other hand. By contrast, a reversed image is produced by two mirrors held at an angle of 90 degrees with respect to each other and this relationship would hold true in FIG. 15 only as between reflectors 74 and 76.

Turning now to FIGS. 16 and 17 which illustrate the fourth form of this invention, it will be noted that an enclosure 90 is provided which closely resembles enclosure 70 above described except that its front window 92 is somewhat narrower than window 72 above mentioned. Disposed within said enclosure 90 is a corner reflector composed of a pair of plane reflectors 94 and 96 which are fixed at right angles to each other to correspond to the relationship and positioning of plane reflectors 74 and 76 above described. A curved reflector 98 in the upper rear corner of enclosure 90, behind window 92, corresponds to curved reflector 82 in the preceding form of the invention. It will now be observed that a plane glass reflector 100 is disposed on a horizontal plane between corner reflector 94, 96 and curved reflector 98. This horizontal plane glass reflector 100 corresponds in performance to plane glass reflector 80 in the preceding form of this invention. Accordingly, two images are formed in curved reflector 98, one normal and corresponding to image 84 and the other reversed and corresponding to image 88.

Thus far the two images, one normal and the other reversed, are shown to be formed in a common horizontal plane, as illustrated in FIGS. 2 and 12. It will now be seen that the two images may be arranged in spaced horizontal planes as illustrated in FIG. 21.

Referring now to FIGS. 18 to 21 inclusive, which illustrate the fifth form of this invention, it will be noted that an enclosure 110 is provided with a plane glass reflector 112 as its front wall. An opaque panel 114 is disposed immediately behind said plane glass wall, in abutment therewith. The opaque panel is somewhat shorter in vertical dimension than the plane glass wall and it is positioned to correspond to the front walls of the two devices last above described. Consequently the upper portion of plane glass wall 112 remains uncovered and there functions as a window.

Behind opaque panel 114 is a corner reflector composed of plane reflectors 116 and 118 respectively, positioned at right angles to each other to correspond to corner reflectors 74, 76 and 94, 96. A convexly curved reflector 120 is disposed above corner reflector 116, 118 and behind that upper portion of plane glass wall 112 which functions as a window.

The schematic view of FIG. 20 may now be examined for the reflection paths of light rays between headlamp and driver. Light ray 122 from head lamp 124 impinges upon the plane glass wall 112 in the area covered by opaque panel 114 and is reflected back to the driver, thereby producing a normal image 126 on said plane glass wall which in this case functions in the manner of a plane reflector. Light ray 128 from the same headlamp impinges upon curved reflector 120 which reflects it downwardly into the corner reflector whence it is reflected back to said curved reflector 120 and from there to the driver. A reversed image 130 is accordingly formed in said curved reflector, being seen therein through the uncovered upper portion of plane glass wall 112. The two images are clearly shown in FIG. 21. The performance of these images is precisely the same as in the preceding forms of the invention except that at no time do they merge into a single image. In short, although relative movement will take place between the two horizontally spaced images 126 and 130, such relative movement will at all times remain confined to the two spaced horizontal planes. In one respect this may be an advantage since the two images will at all times be discernible one from the other.

The sixth form of this invention as illustrated in FIGS. 22 and 23 also produces a pair of images in spaced horizontal planes. The device therein shown in provided with an enclosure 140 which corresponds substantially to enclosures 70 and 90 except that its window 142 is somewhat larger in its vertical dimension. A corner reflector consisting of a pair of plane reflectors 144 and 146 is disposed within said enclosure 140 behind its front wall and said corner reflector corresponds to those shown in the three preceding forms of the invention.

A convexly curved reflector 148, corresponding to reflectors 82, 98 and 120, is disposed above corner reflector 144, 146. A second convexly curved reflector 150 is mounted vertically above curved reflector 148. The two curved reflectors are positioned to receive light rays from a headlamp passing through window 142. It is clear from the showing of FIG. 23 that a normal image will be formed in curved reflector 150 while a reversed image will be formed in curved reflector 148.

Reference now to FIG. 21 which relates to the preceding form of the invention will show that the normal full image 126 is disposed below the reversed image 130 and that said reversed image is somewhat foreshortened in its vertical dimension. The corresponding images formed in the device shown in FIGS. 22 and 23 will be reversed in position, the normal image being formed above the reversed image; both images are foreshortened in a vertical direction, since they are both formed in curved reflectors.

The foregoing is illustrative of preferred forms of the invention, and it will be understood that other forms may be provided within the basic principles of the invention as above described and the broad scope of the claims.

I claim:

1. An optical guidance system for guiding a motor vehicle into a confined parking space by the use of two light-reflecting systems which function concurrently to produce two visual images, one normal and the other reversed, of a single horizontally moving reference object such as one of the headlights of said motor vehicle, said optical guidance system comprising a pair of simple reflectors and a compound reflector, said simple reflectors being horizontally elongate, substantially co-extensive and providing convex reflecting surfaces which are exposed to the view of the driver of an oncoming motor vehicle, said simple reflectors being situated adjacent each other in different horizontal planes, said compound reflector being situated adjacent one of said simple reflectors in another horizontal plane, said compound reflector having a vertical bisecting plane which passes through both simple reflectors, producing in the simple reflector which is adjacent said compound reflector a reversed image of such horizontally moving reference object on said motor vehicle, the other simple reflector producing a normal image of the same horizontally moving reference object, whereby said normal and reversed images are simultaneously visible in said simple reflectors in vertical alignment with each other when said reference object occupies a predetermined position relative to said simple reflectors and out of vertical alignment with each other when said reference object occupies any other position relative to said simple reflector.

2. An optical guidance system in accordance with claim 1, wherein the compound reflector comprises a pair of plane reflectors positioned at right angles to each other.

3. An optical guidance system in accordance with claim 1, wherein the compound reflector comprises a pair of plane reflecting surfaces positioned at right angles to each other, both simple reflectors being focused to face the driver of such oncoming motor vehicle, the simple reflector which is adjacent the compound reflector being also focused to face said compound reflector, all three reflectors being mounted in a common enclosure having a front wall and a front window, said simple reflectors being exposed to the view of said driver through said window and said compound reflector being concealed from his view behind said wall.

References Cited in the file of this patent

UNITED STATES PATENTS

| | | |
|---|---|---|
| 1,377,161 | Vanderbeek | May 3, 1921 |
| 1,722,209 | Gordon | July 23, 1929 |
| 1,764,771 | Arnott | June 17, 1930 |
| 1,981,188 | Pavitt | Nov. 20, 1934 |
| 1,991,054 | Hampke | Feb. 12, 1935 |
| 2,180,013 | Mihalyi | Nov. 14, 1939 |
| 2,441,160 | Martin | May 11, 1948 |

FOREIGN PATENTS

| | | |
|---|---|---|
| 261,065 | Great Britain | Nov. 5, 1926 |